United States Patent
Bartolo (10) Patent No.: US 10,989,086 B2
(45) Date of Patent: Apr. 27, 2021

(54) METHOD FOR PURIFYING THE EXHAUST GASES OF A VEHICLE, CORRESPONDING PURIFICATION DEVICE

(71) Applicant: Faurecia Systemes D'echappement, Nanterre (FR)

(72) Inventor: Xavier Bartolo, Étouvans (FR)

(73) Assignee: Faurecia Systemes D'echappement

( * ) Notice: Subject to any disclaimer, the term of this patent is extended or adjusted under 35 U.S.C. 154(b) by 0 days.

(21) Appl. No.: 15/944,916

(22) Filed: Apr. 4, 2018

(65) Prior Publication Data
US 2018/0291786 A1    Oct. 11, 2018

(30) Foreign Application Priority Data
Apr. 7, 2017 (FR) ...................... 1753066

(51) Int. Cl.
*F01N 3/20* (2006.01)
*F01N 9/00* (2006.01)
(Continued)

(52) U.S. Cl.
CPC ............. *F01N 3/2013* (2013.01); *F01N 9/00* (2013.01); *F01N 11/005* (2013.01);
(Continued)

(58) Field of Classification Search
CPC ............... F01N 11/005; F01N 13/0097; F01N 2240/16; F01N 2370/22; F01N 2550/22; F01N 2900/08; F01N 3/101; F01N 3/103; F01N 3/2013; F01N 3/2066; F01N 9/00; Y02A 50/2322; Y02T 10/26; Y02T 10/47
See application file for complete search history.

(56) References Cited

U.S. PATENT DOCUMENTS

| 4,210,016 A | * | 7/1980 | Peter ......................... G01F 1/40 73/114.34 |
| 2005/0115224 A1 | * | 6/2005 | Kojima ................. F01N 3/0211 60/282 |

(Continued)

FOREIGN PATENT DOCUMENTS

| FR | 1294851 A | 6/1962 |
| FR | 2778206 A1 | 11/1999 |

(Continued)

OTHER PUBLICATIONS

English Translation of JP H0331510 (Year: 1991).*
Search Report for French Application No. 1753066 dated Sep. 22, 2017.

*Primary Examiner* — Anthony Ayala Delgado
(74) *Attorney, Agent, or Firm* — Carlson, Gaskey & Olds, P.C.

(57) ABSTRACT

A purification method comprises providing a purification device comprising at least one exhaust gas purification member having an upstream surface through which the exhaust gas enters the purification member and a downstream surface through which the exhaust gases exit the purification member. The method further includes, in the absence of forced circulation of the exhaust gas through the purification member by an engine of the vehicle, heating radiatively at least either the upstream zone or the downstream zone, for example before starting the engine of the vehicle.

22 Claims, 5 Drawing Sheets

(51) Int. Cl.
  *F01N 13/00* (2010.01)
  *F01N 11/00* (2006.01)
  *F01N 3/10* (2006.01)

(52) U.S. Cl.
  CPC .......... *F01N 13/0097* (2014.06); *F01N 3/101* (2013.01); *F01N 3/103* (2013.01); *F01N 3/2066* (2013.01); *F01N 2240/16* (2013.01); *F01N 2370/22* (2013.01); *F01N 2550/22* (2013.01); *F01N 2900/08* (2013.01); *Y02A 50/20* (2018.01); *Y02T 10/12* (2013.01); *Y02T 10/40* (2013.01)

(56) References Cited

U.S. PATENT DOCUMENTS

| | | |
|---|---|---|
| 2008/0028753 A1 | 2/2008 | Wagner et al. |
| 2012/0011834 A1* | 1/2012 | Sobue .................. F01N 3/2013 60/300 |
| 2014/0343747 A1* | 11/2014 | Culbertson ............ G05D 23/19 700/300 |
| 2017/0226909 A1 | 8/2017 | Hirth et al. |

FOREIGN PATENT DOCUMENTS

| | | | |
|---|---|---|---|
| JP | H0331510 A | | 2/1991 |
| JP | H0331510 U | * | 3/1991 |
| WO | 2014176585 A1 | | 10/2014 |

* cited by examiner

METHOD FOR PURIFYING THE EXHAUST GASES OF A VEHICLE, CORRESPONDING PURIFICATION DEVICE

CROSS-REFERENCE TO RELATED APPLICATION

This application claims priority to FR 1753066, filed Apr. 7, 2017.

FIELD OF THE INVENTION

The invention generally relates to methods of purifying the exhaust gas of a vehicle.

BACKGROUND

Exhaust lines of vehicles equipped with thermal engines typically include catalytic purification members in order, for example to convert NOx, CO and hydrocarbons to $N_2$, $CO_2$ and $H_2O$. Such members are only effective when the catalytic material is at a given minimum temperature.

Thus, immediately after starting the engine of the vehicle, the exhaust gases are only slightly cleansed, because the purification member is not yet sufficiently hot.

In this context, the invention aims to provide a method for purifying the exhaust gas of a vehicle in which the pollution of the exhaust gas is more efficient upon starting the engine.

SUMMARY OF INVENTION

To this end, according to a first aspect, the invention relates to a method for purifying the exhaust gas of a vehicle, wherein the method comprises the following steps:
- providing a purification device comprising at least one exhaust gas purifying member having an upstream surface through which the exhaust gases enter the purification member and a downstream surface through which the exhaust gases exit the purification member;
- in the absence of forced exhaust gas circulation by a vehicle engine through the purification member, heating of at least an upstream zone or a downstream zone of the member in a radiative purification manner, for example before starting the engine of the vehicle, wherein the upstream zone is an end section of the purification member that extends from the upstream surface in a main direction of flow of the exhaust gas over a distance of a few millimeters to a few centimeters in the direction of the downstream surface, while the downstream zone is an end section of the purification member which extends from the downstream surface in the main direction of flow of the exhaust gas over a distance of a few millimeters to a few centimeters in the direction of the upstream surface;
- wherein the heating step is performed with a heating member placed opposite and remote from the upstream surface or the downstream surface, wherein the heating member comprises at least one electrically-powered heating element.

Thus, before the start of the forced circulation of exhaust gas by the engine, the upstream zone or the downstream zone of the purification member is heated radiatively. Such heating may occur even in the absence of gas circulation, because it is radiative. It effectively allows heating of the upstream zone or the downstream zone of the purification member, so that at least a portion of the purification member is already hot when the flow of exhaust gas begins, typically upon starting the vehicle engine.

The rise in temperature of the purification member is thus accelerated, and the purification of the exhaust gas begins soon after the engine is started, or even upon the engine being started if the radiative heating makes it possible to bring the engine purification member up to its minimum operating temperature.

If the purification member is heated exclusively by the heat provided by the exhaust gas, or is convectively heated by a heating member placed upstream of the purification member, the heat transfer and the temperature rise of the purification member may not intervene until the exhaust gases circulate in the exhaust line. The rise in temperature will thus be much slower.

The purification method may also have one or more of the following characteristics, considered individually or in any technically feasible combination:
- the electrically-powered heating element is heated to a temperature of between 300° C. and 1200° C.
- the, or each, heating element has an elongated shape and a cross-section between 0.002 $mm^2$ and 80 $mm^2$;
- the, or each, heating element is made of a material chosen from FeCrAl and its alloys, NiCr and its alloys, stainless steel or inconel;
- wherein the method comprises the following steps:
- acquisition of the intensity of the electric current supplying the heating element and the electrical voltage at the terminals of the heating element;
- determination of the temperature of the, or each, heating element using the electrical intensity and voltage acquired;
- wherein the method comprises the following steps:
- electrical supply to the heating member;
- acquisition of the intensity of the electric current supplying the heating element and the electrical voltage at the terminals of the heating element, when the heating element is at a known predetermined temperature;
- evaluation of the electrical resistance of the, or each, heating element using the electrical intensity and voltage acquired;
- detection of any damage to the, or at least one of the, heating elements by using the rated electrical resistance;
- wherein the method comprises the following steps:
- electrical supply of the heating member;
- acquisition of the intensity of the electric current supplying the heating member and the electric voltage across the terminals of the heating member, under conditions in which the heating member generates a negligible quantity of heat;
- determination of the temperature of the exhaust gas using the electrical intensity and voltage acquired;
- wherein the method comprises the following steps:
- electrical supply of the heating member;
- acquisition of the intensity of the electric current supplying the heating member and the electrical voltage at the terminals of the heating member;
- determination of the temperature of the, or each, heating element using the electrical intensity and voltage acquired;
- determination of a theoretical temperature of the, or each, heating element that would be reached in the absence of exhaust gas circulation;
- determination of the flow rate of the exhaust gas by using the temperature of the, or each, heating element previously determined and the theoretical temperature of the, or each, heating element previously determined;

wherein a reflector is placed on the opposite side to the upstream or downstream surface with respect to the heating element, wherein it reflects towards the upstream or downstream surface a thermal radiation emitted by the heating element in a direction opposite to the upstream or downstream surface;

wherein the method comprises a step of forced circulation of the exhaust gases through the purification member, wherein the heating member heats the upstream zone radiatively and convectively during the circulation step;

wherein the method comprises a step of forced circulation of the exhaust gases through the purification member, wherein the heating member radiatively heats the downstream zone and heats another purification member at least convectively during the forced circulation step;

wherein the heating member is placed between the purification member and another purification member, wherein the other purification member has another upstream surface through which the exhaust gases enter the other purification member and another downstream surface through which the exhaust gas exits the other purification member, wherein the heating member, in the absence of forced exhaust gas circulation by the engine through the purification member and the other purification member, heats another upstream zone of the other purification member and the downstream zone radiatively, wherein the other upstream zone is an end section of the other purification member which extends from the other upstream surface in a main flow direction of the exhaust gas over a distance of a few millimeters to a few centimeters in the direction of the other downstream surface;

wherein the heating member transmits to the purification member, during the heating step, a radiative thermal power of between 500 W and 10 kW.

According to a second aspect, the invention relates to a device for purifying the exhaust gases of a vehicle, wherein the device comprises:

at least one exhaust gas purification member having an upstream surface through which the exhaust gases enter the purification member and a downstream surface through which the exhaust gases exit from the purification member;

a heating member placed opposite and at a distance from the upstream surface or the downstream surface, and that is configured to heat an upstream zone or a downstream zone of the purification member in a radiative manner in the absence of exhaust gas circulation forced through the purification member by an engine, for example before starting the engine of the vehicle, wherein the upstream zone is an end section of the purification member which extends from the upstream surface in the direction of the main flow of the exhaust gas over a distance of a few millimeters to a few centimeters in the direction of the downstream surface, wherein the downstream zone is an end section of the purification member which extends from the downstream surface in the direction of the main flow of exhaust gas over a distance of a few millimeters to a few centimeters in the direction of the upstream surface.

The purification device may also have one or more of the following characteristics, considered individually or in any technically feasible combination:

the purification device comprises another purification member having another upstream surface through which the exhaust gases enter the other purification member and another downstream surface through which the exhaust gases exit from the other purification member, wherein the heating member is placed between the purification member and the other purification member, wherein the heating member is designed, in the absence of exhaust gas circulation forced through the purification member by the engine and the other purification member, heating an upstream zone of the other purification member and the downstream zone radiatively, wherein the other upstream zone is an end section of the other purification member which extends from the other upstream surface according in the direction of the main flow of the exhaust gases over a distance of a few millimeters to a few centimeters towards the other downstream surface.

the heating member is designed, in the event of forced circulation of the exhaust gases through the purification member and the other purification member, to radiatively heat the downstream zone of the purification member, and to heat the upstream zone of the other purification member in a convective and radiative manner.

According to a third aspect, the invention relates to an exhaust line comprising a purification device having the above characteristics.

BRIEF DESCRIPTION OF THE DRAWINGS

Other features and advantages of the invention will emerge from the detailed description given below for information only and in no way limitative, with reference to the appended figures, wherein.

DETAILED DESCRIPTION

Figure 1:
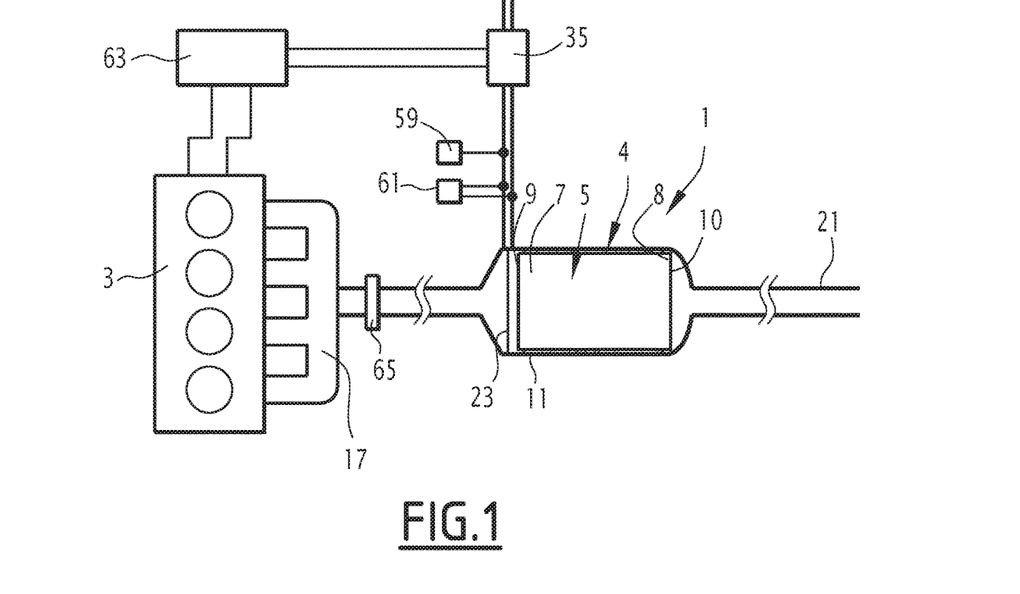
FIG. 1 shows a simplified schematic representation of an exhaust line according to the invention.

The exhaust line 1 shown in FIG. 1 is intended to be installed on board a vehicle, typically a vehicle equipped with a thermal engine 3. This vehicle is typically a motor vehicle, for example a car or a truck.

As may be seen in FIG. 1, the exhaust line 1 comprises a device 4 for purifying the exhaust gases. This device 4 comprises at least one exhaust gas purification member 5 having an upstream surface 9 through which the exhaust gases enter the purification member 5, and a downstream surface 10 through which the exhaust gases exit the purification member 5.

In the present description, "upstream" and "downstream" are understood to mean relative to the direction of the normal circulation of the exhaust gas.

The upstream zone 7 is the end section of the purification member 5 which extends from the upstream surface 9 in the direction of the main flow of the exhaust gases over a distance L1 of a few millimeters to a few centimeters in the direction of the downstream surface 10.

The downstream zone 8 is the end section of the purification member 5 which extends from the downstream surface 10 in the direction of the main flow of the exhaust gases over a distance L2 of a few millimeters to a few centimeters in the direction of the upstream surface 9.

The purification member 5 is for example an SCR catalyst, a three-way catalyst, an oxidation catalyst or a NOx trap.

Figure 2:
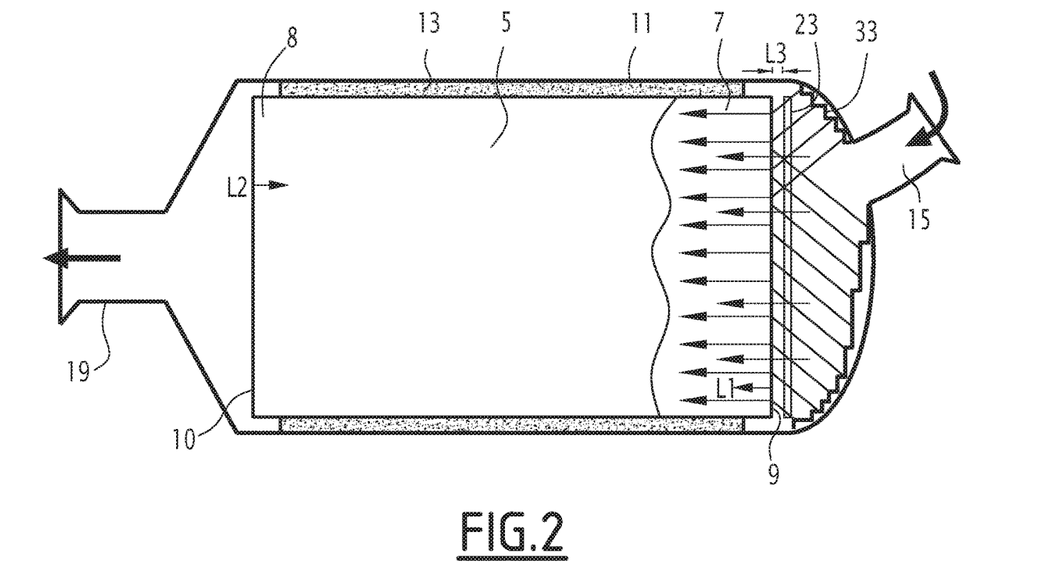
FIG. 2 shows a simplified schematic representation of the purification member of the exhaust line of FIG. 1.

As may be seen for example in FIG. 2, the purification member 5 is placed inside a casing 11, with the interposition of a holding ply 13. The casing 11 has an exhaust gas inlet 15 that is fluidly connected to a manifold 17 (FIG. 1) to sense the exhaust gases leaving the combustion chambers of the thermal engine 3.

The casing 13 also has an outlet 19 that is fluidly connected to a cannula 21 for the release of purified exhaust gas into the atmosphere.

The purification device 4 further comprises a heating member 23 placed opposite and at a distance L3 from the upstream surface 9 of the purification member 5.

The heating member 23 is designed to heat the upstream zone 7 radiatively in the absence of forced circulation of the exhaust gas through the purification member 5 by the engine 3.

By this is meant that, under nominal operating conditions of the heater and in the absence of exhaust gas flow through the purification member 5, the heating member 23 is designed to transmit to the purification unit 5 radiative thermal power that is greater than a predetermined minimum. This minimum is, for example, 100 W, preferably greater than 500 W. Typically, under the conditions set out above, the heating member 23 radiatively transmits a thermal power of between 500 W and 10 kW to the purification member 5.

This thermal power corresponds only to the power supplied radiatively, and not to the total electric power supply of the heating member 23.

The heating member 23 is placed inside the casing 11.

Figure 3:
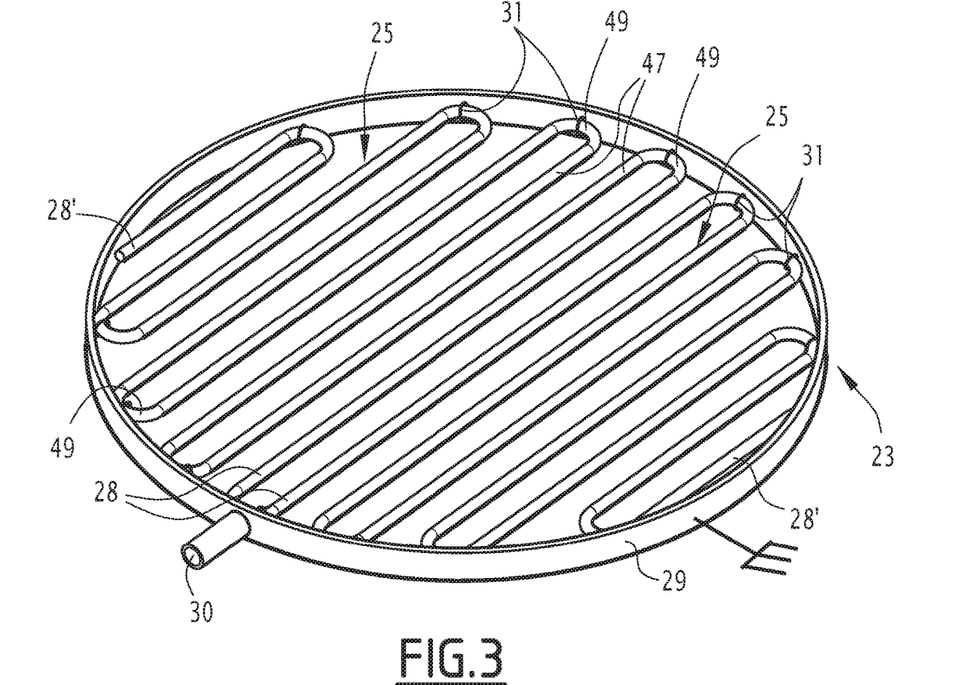
FIG. 3 shows a diagrammatic representation in perspective of the heating member of the purification device of FIG. 2.

Advantageously, the heating member 23, as illustrated in particular in FIG. 3, comprises at least one heating element 25.

The, or each, heating element 25 is typically of the resistive type, and is electrically powered.

The, or each, heating element 25 is heated to a temperature between 300 and 1300° C., preferably between 500 and 1000° C., in order to emit mainly in the infrared range.

In this case, the purification device 4 comprises a power supply 27. The, or each, heating element 25 is electrically connected by a first end 28 to a terminal of the power supply 27 which is at a first electrical potential, and by a second end 28' to a terminal of the power supply 27 which is at a second electric potential.

The first end 28 is typically electrically connected to a source of electrical energy, which is, for example, the electric battery of the vehicle. Alternatively, it may be another source of energy.

The electrical power source typically provides a DC or chopped current at a vehicle-dependent voltage (12, 48 or 400 volts, for example).

The second end 28' is typically electrically connected directly to ground, or is merged with ground.

Advantageously, the, or each, heating element 25 has an elongated shape. Typically, it is a wire.

In this case, each heating element has a cross-section of between 0.002 mm$^2$ and 80 mm$^2$, preferably between 0.0075 mm$^2$ and 5 mm$^2$, and more preferably between 0.03 mm$^2$ and 0.2 mm$^2$.

For wire with a circular cross-section, this corresponds to a diameter of between 0.05 mm and 10 mm, preferably between 0.1 mm and 2.5 mm, and even more preferably between 0.2 mm and 0.5 mm.

The, or each, heating element 25 is made of a material designed to withstand the above temperatures, and to resist oxidation in the presence of exhaust gas. Preferably it is of a material selected from FeCrAl and its alloys, NiCr and its alloys, stainless steel or inconel. For example, the, or each, element is Kanthal® A1, Nichrome® 80 or Nikrothal® 80.

The nominal operating temperature of the heating element, as well as the nominal total radiative thermal power and, possibly, the nominal total convective thermal power of the heating element, determine the total external surface area required for the heating element(s). This surface, in turn, determines the cross-section of the, or each, heating element, and the total length of the heating element(s).

The cross-section of the, or each, heating element is determined, in particular, by taking into account the characteristics of the power supply 27. In fact, the electrical resistance of the, or each, heating element increases with the length of this heating element and decreases with its cross-section. The, or each, heating element thus has, between its first and second ends 28 and 28', a length limited by the voltage available on board the vehicle.

For a nominal electric power of 1300 W for heating, the total length of the heating elements is about 7 m for elements of 0.03 mm$^2$ cross-section. The total length of 7 m is obtained by using 40 elongated heating elements, each 17 cm in length.

The heating element(s) is/are configured to form a flat heating member, extending substantially parallel to the upstream surface 9 of the purification member 5.

As may be seen in FIG. 3, the heating member 23, in addition to the heating element(s) 25, comprise(s) a frame 29. In FIG. 3, only two heating elements 25 are shown.

The linear heating element(s) 25 is/are arranged in one or more planes, parallel to each other or to one another. For example, the, or each, heating element 25 is linked only to the frame and possibly to the other heating elements, or to itself.

The planes in which the heating element(s) 25 is/are located are parallel to the upstream surface 9. In FIG. 3, only one layer of heating elements 25 is shown.

Typically, the heating element(s) 25 are arranged in one or more superimposed layers. The heating member 23 thus comprises between 1 and 20 superimposed layers.

The frame 29 is typically attached to the casing 11. Thus, neither the heating elements 25 nor the frame 29 is attached directly to the purification member 5. Alternatively, the frame 29 is constituted by a zone of the casing 11.

The frame 29 is made of an electrically-conductive material. It comprises an orifice 30 through which the, or each, first end 28 is electrically connected to the power supply 27. The second end 28' of each linear heating element 25 is electrically connected to the frame 29.

Preferably, the, or each, heating element 25 is free of electrically insulating coating.

In order to avoid short circuits, the, or each, heating element 25 must be electrically isolated from the frame 29 and possibly from the other heating elements 25 over its entire length.

In the example of FIG. 3, the, or each, linear heating element 25 is fixed to the frame 29 at a plurality of points distributed over its entire length via the electrically-insulating fasteners 31.

As indicated above, the, or each, heating element 25 is advantageously connected to the other heating elements or to itself by electrically insulating elements. This makes it possible to increase the rigidity of the heating member.

As illustrated in FIG. 2, the purification device advantageously comprises a reflector 33 placed on the opposite side to the upstream surface 7 with respect to the heating member 23. Thus, the thermal radiation emitted by the heating member 23 in a direction opposite to the upstream surface 9 is reflected by the reflector 33 towards the upstream surface 9.

The reflector 33 is placed in the casing 11.

Alternatively, the reflector 33 may be constituted by a zone of the casing 11.

The purification device 2 further comprises a controller 35 arranged to drive the heating member 23.

The controller 35 comprises, for example, an information processing unit formed by a processor and a memory associated with the processor. Alternatively, the controller 35 may be embodied in the form of programmable logic components, such as a Field Programmable Gate Array (FPGA), or in the form of dedicated integrated circuits, such as ASIC (Application-Specific Integrated Circuit).

The operation of the purification device 2 according to the embodiment of FIG. 2 will now be detailed.

The controller 35 triggers the heating by controlling the power supply to the heating member 23 from the power supply 27, in the absence of exhaust gas circulation forced by the engine 3 through the control unit purification 5, for example before starting the thermal engine 3 of the vehicle.

The controller 35 is, for example, configured to start the heating when the doors of the vehicle are unlocked, or when the key is inserted into the corresponding key slot, or even when the key is turned to a first position controlling the circuit power supply without starting the engine.

The, or each, heating element 25, once electrically powered, quickly reaches its nominal operating temperature. It then emits infrared radiation, and heats the upstream zone radiatively. The heating member 23 heats the upstream zone 7 of the purification member 5 to a depth ranging from a few millimeters to a few centimeters from the upstream surface 9.

Advantageously, the upstream zone 7 that is radiatively heated by the heating member 23 is coated with a specific catalytic layer, typically with a higher precious metal content in order to increase the cleansing efficiency. Only the zone 7 comprises such a coating, while the rest of the purification member does not.

The part of the infrared thermal radiation directed opposite the upstream zone 7 is reflected by the reflector 33 and returned to the upstream surface 9.

Once the engine has started, the exhaust gases circulate forcibly through the purification member 5. The heating member 23 then heats the upstream zone 7 radiatively and convectively.

Figure 4:
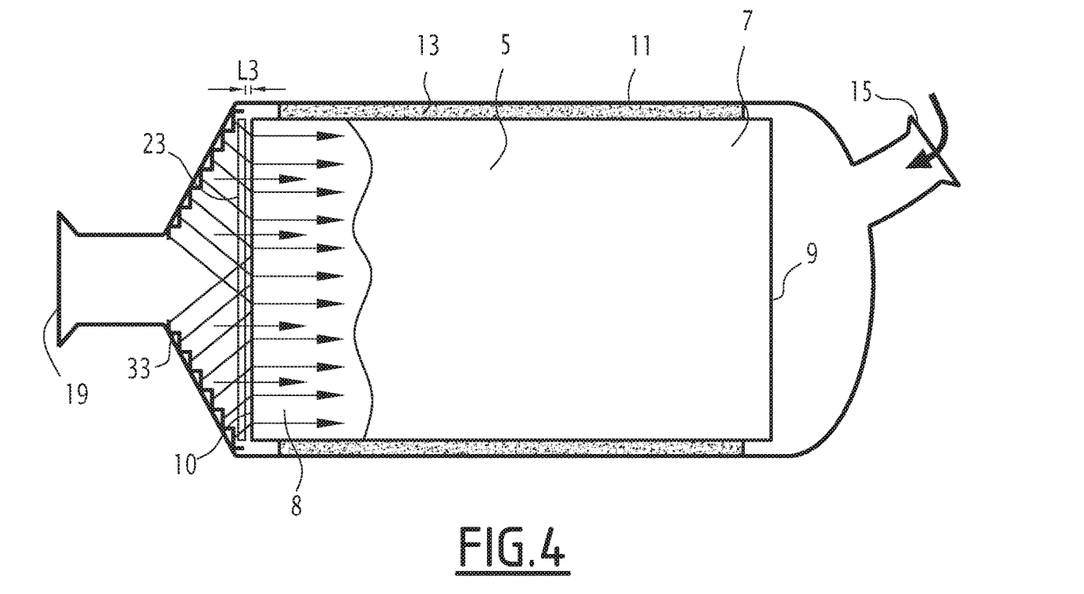
FIG. 4 shows a view similar to that of FIG. 2 in an alternative embodiment of the invention wherein the heating member is placed opposite the downstream surface of the purification member.

According to the alternative embodiment shown in FIG. 4, the heating member 23 is arranged at a distance L3 to face the downstream surface 10. The reflector 33 is arranged opposite the downstream zone 8 with respect to the heating member 23.

The operation of the purification device 4 in this case is as follows.

Before starting the engine, in the absence of the forced circulation of the exhaust gas through the purification member 5 by the engine, the heating member 23 radiatively heats the downstream zone 8 of the purification member 5. The heating member 23 heats the zone 8 to a depth of a few millimeters to a few centimeters from the downstream surface 10. The zone 8 is advantageously coated with a special catalytic layer, like zone 7 of the alternative embodiment of FIG. 2.

Once the engine has started, the exhaust gases circulate forcibly through the purification member 5. The heating member 23 then radiatively heats the downstream zone 8 of the purification member, and possibly heats in a convective manner, another purification member which is located downstream of the purification member 5.

Figure 5:
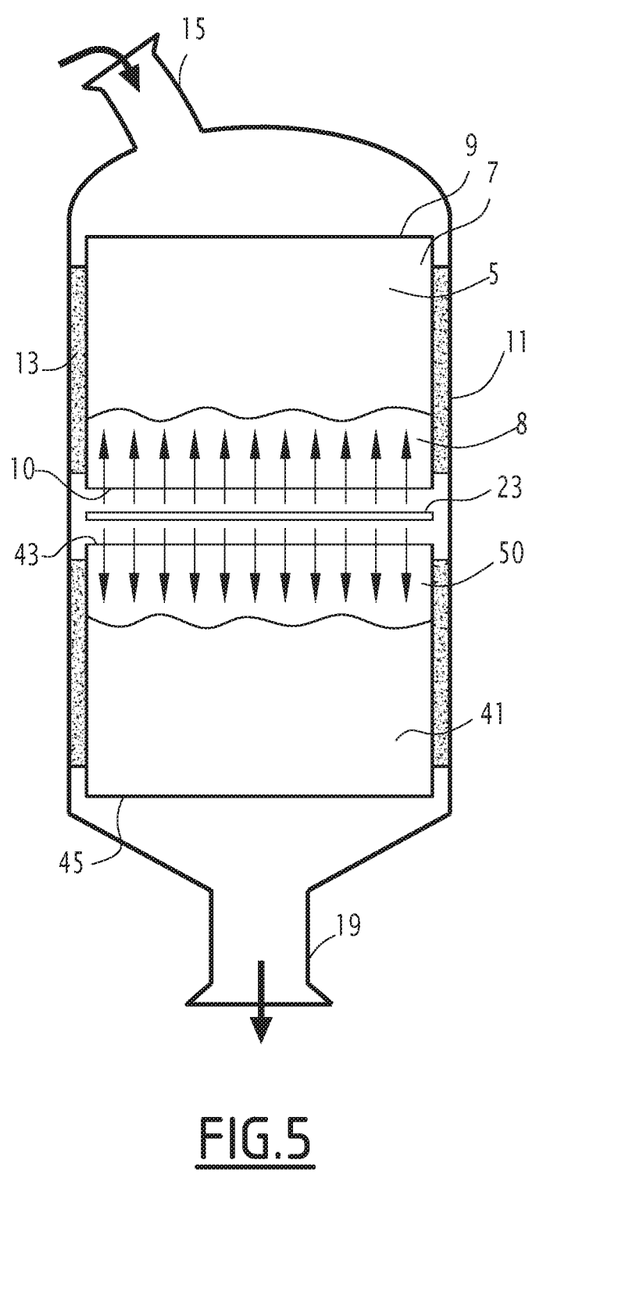
FIG. 5 shows a schematic representation of yet another alternative embodiment of the invention, wherein the heating member is placed between two purification members.

The heating element 23 according to another variant is arranged as shown in FIG. 5 between the purification member 5 and another purification member 41.

This other purification member 41 has another upstream surface 43 through which the exhaust gas enters the other purification member, and another downstream surface 45 through which the exhaust gas exits the other purification member. The two purification members 5, 41 are relatively close to each other, so that the heating member 23 is placed to face the downstream surface 10 of the purification member 5 and opposite the other upstream surface 43. The heating member 23 is thus configured to radiatively heat, in the absence of forced exhaust gas circulation by the engine through the purification members 5 and 41, both the downstream zone 8 of the purification member 5, and another upstream zone 50 belonging to the other purification member 41.

The other upstream zone 50 is an end section of the other purification element 41 which extends from the other upstream surface 43 in the main direction of flow of the exhaust gases over a distance of a few millimeters to a few centimeters towards the other downstream surface 45.

After starting the engine 3, the heating member 23 radiatively heats the downstream zone 8, and radiatively and convectively heats the other upstream zone 50.

Figure 6:
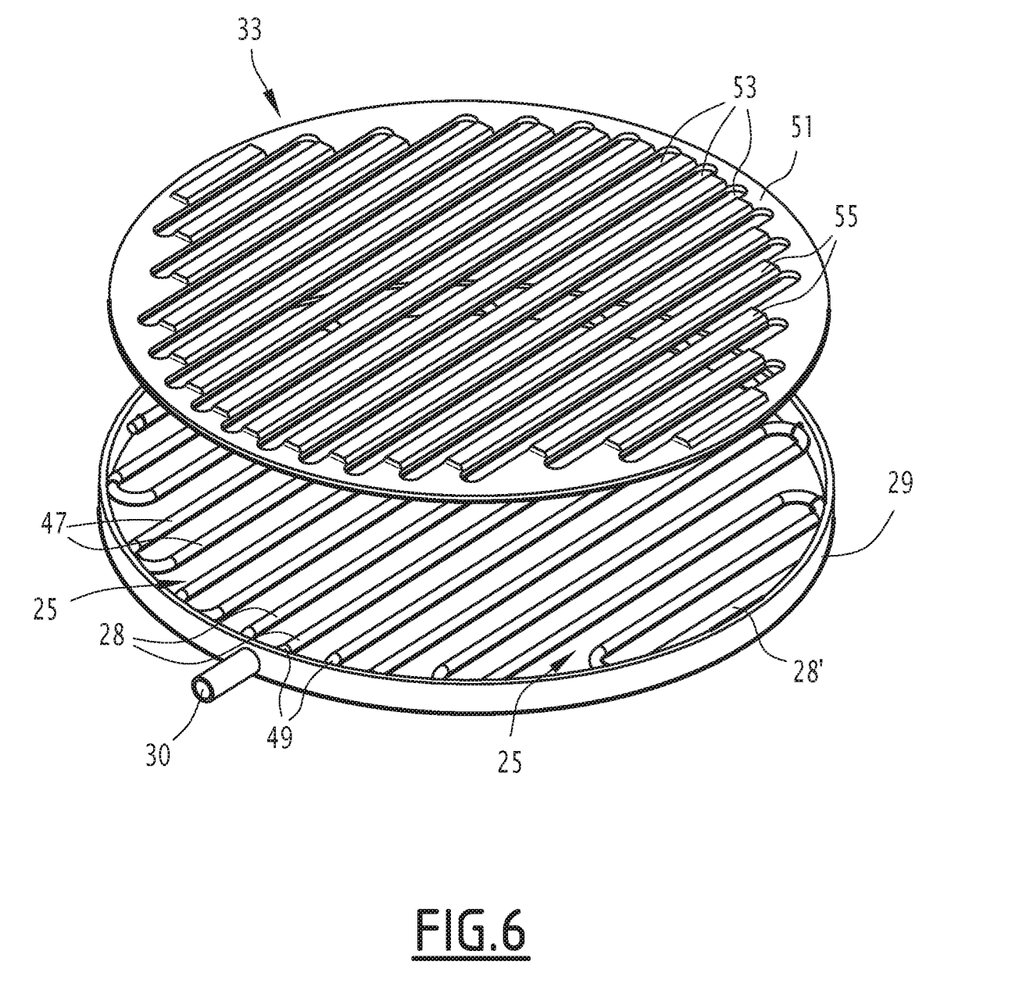
FIGS. 6 and 7 show a reflector designed to return a portion of the thermal radiation to the purification member.
Figure 7:
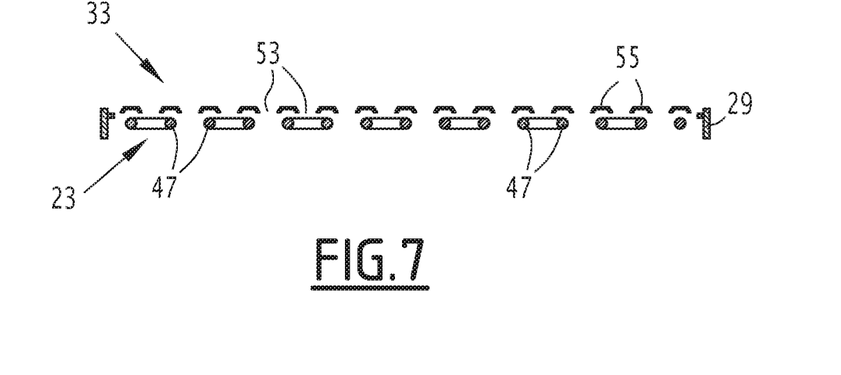

FIGS. 6 and 7 show an alternative embodiment of the reflector 33. As shown in FIG. 7, it is placed in close proximity to the heating member 23. It is particularly suitable for a heating member 23 configured so that the, or each, linear heating element 25 is arranged in an accordion arrangement, as shown in FIG. 6. Thus, the linear heating element(s) 25 form(s) a plurality of straight sections 47, connected by twists 49. The twists 49 are located along the frame 29.

The reflector 33 has a circumferential solid edge 51 that internally defines an opening 53, and a plurality of blades 55.

The blades 55 are placed in the opening 53 and are integral at their two ends opposite the solid edge 51. They are all parallel to each other.

As may be seen in FIG. 7, each blade 55 extends parallel to, and in close proximity to, one of the straight sections 47.

When viewed perpendicularly to the straight section 47, each blade 55 has a concave cross-section towards the straight section 47.

Each blade 55 preferably has a parabolic section, wherein the corresponding straight section 47 is placed in the focus of the parabola. Thus, as illustrated in FIG. 7, each blade 55 reflects the radiation emitted by the segment 47 in a determined direction, for example perpendicular to the upstream surface or the downstream surface.

The section of each blade 55 need not be parabolic but may be arranged to distribute the reflected infrared radiation uniformly on the large upstream surface or the large downstream surface.

The peripheral edge 51 of the reflector 33 follows the frame 29.

The controller 35 is designed, in particular, to choose the voltage and the electric current supplied by the power supply 27 to the heating member 23, in order to maintain the heating power and/or the electric power consumed within a certain range.

Typically, the controller 35 controls the Pulse Width Modulation (PWM) heating.

The purification device 4 also comprises a member for acquiring the intensity of the electric current supplying the linear heating elements 25 and the electrical voltage across the linear heating elements 25.

This member is of any suitable type.

For example, this member may comprise a sensor 59 for measuring electrical current and a sensor 61 for measuring the electrical voltage (FIG. 1). Alternatively, the intensity of the electric current and the electrical voltage are obtained by calculation from information recovered in the controller 35.

Figure 8:
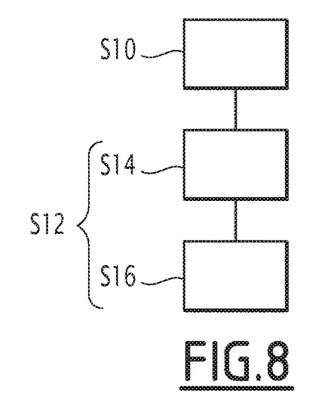
FIGS. 8 to 11 show step diagrams of various control or diagnostic methods that may be integrated in the method of the invention.

The controller 35 is advantageously designed to implement a first control program, as shown in FIG. 8. This program comprises the following steps;

acquiring the intensity of the electric current supplying the heating member 23 and the electric voltage across the terminals of the heating member 23 (step S10); and determining the temperature of the, or each, heating element 25 using the acquired electrical intensity and voltage (step S12).

Step S10 is performed using the acquisition member provided for this purpose.

Step S12 comprises a substep S14 to determine the electrical resistance of the, or each, heating element 25.

The electrical resistance is determined by relating the acquired electrical voltage to the acquired electrical intensity, while taking into account the number and arrangement of the heating element(s) 25.

Step S12 also comprises a substep S16 to determine the temperature of the, or each, heating element 25 by using the electrical resistance previously determined in step S14.

In fact, the electrical resistance of the, or each, heating element 25 varies as a function of the temperature of the heating element 25. The knowledge of the electrical resistance therefore makes it possible to deduce the temperature of the heating element 25.

Step S12 is performed by the controller 35, using any suitable method such as curves, tabulations, or mathematical formulas, wherein the curves, tabulations or mathematical formulas are stored in the memory of the controller 35.

This program is typically implemented while the heating member 23 is in operation, and heats the purification member 5 to its nominal power.

Figure 9:
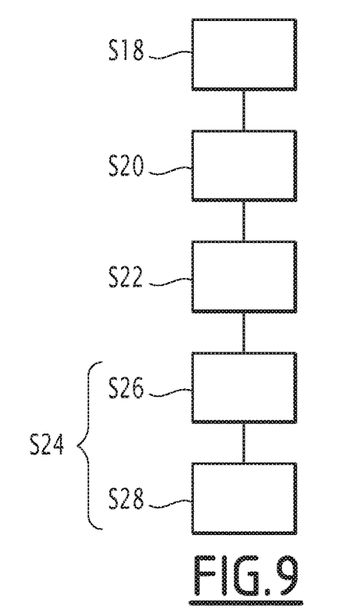

In addition to, or in place of, the first control program above, the controller 35 may be configured to implement a second control program comprising the following steps as shown in FIG. 9:

electrically supplying the heating member 23 (step S18);

acquiring the intensity of the electric current supplying the heating member 23 and the electrical voltage at the terminals of the heating member 23 when the heating member 23 is at a known determined temperature (step S20);

evaluating the electrical resistance of the, or each, heating element 25 using the acquired electrical intensity and voltage (step S22); and detecting any damage to the, or one of the, heating elements 25 using the rated electrical resistance (step S24).

This program is typically implemented before the vehicle is started, when the engine is cold. The device is then at room temperature. This ambient temperature is measured by a vehicle temperature sensor, or may be retrieved by the controller 35 in the on-board computer 63 of the vehicle (FIG. 1).

Advantageously, the intensity and the electrical voltage are acquired under conditions in which the heating member does not generate heat, or generates a quantity of heat that is practically negligible.

For example, during step S18, the heating member 23 is electrically powered with an electric power of less than 10% of a nominal electrical operating power of the device, preferably less than 5% of the rated power, more preferably less than 1% of the nominal electric power. Alternatively, the heating member 23 may be electrically powered at a high power, but the intensity and voltage are acquired in the initial few milliseconds just after starting the power supply.

In step S20, the intensity of the current and the electrical voltage at the terminals of the heating member 23 are acquired as described above, for example using the sensors 59 and 61, or by directly calculating the current and the voltage from quantities available in the controller 35.

In step S22, the electrical resistance of the, or each, heating element 25 is evaluated by relating the previously acquired electrical voltage and electrical current, taking into account the number and arrangement of the heating element(s).

Step S24 comprises a substep S26 for comparing the previously evaluated electrical resistance with a theoretical electrical resistance of the, or each, heating element 25. The theoretical electrical resistance is a predetermined value for the determined temperature in question that is recorded in the memory of the controller 35, or modeled by the controller 35 according to operating parameters.

Preferably, the determined temperature in question is low, typically below 40° C.

During the comparison sub-step S26, for example, the difference between the evaluated electrical resistance and the theoretical electrical resistance, or the ratio between the evaluated electrical resistance and the theoretical electrical resistance, is carried out.

Step S24 further comprises a diagnostic sub-step S28 for the possible damage to the heating element(s) 25. If the previously evaluated electrical resistance deviates too much from the theoretical electrical resistance, it is concluded that one or more heating elements 25 are damaged. On the contrary, if the rated electrical resistance and the theoretical electrical resistance are close to each other, it is concluded that the heating element(s) 25 are not damaged. For example, a difference between the rated electrical resistance and the theoretical electrical resistance greater than 10% of the value of the theoretical electrical resistance for the temperature in question, will be understood to mean that one or more heating elements 25 are damaged. Similarly, a ratio of the rated electrical resistance to the theoretical electrical resistance of less than 0.9 or greater than 1.1 will be considered to mean that one or more of the heating elements 25 are damaged.

Steps S22 and S24 are typically calculation steps performed by the controller 35.

Figure 10:
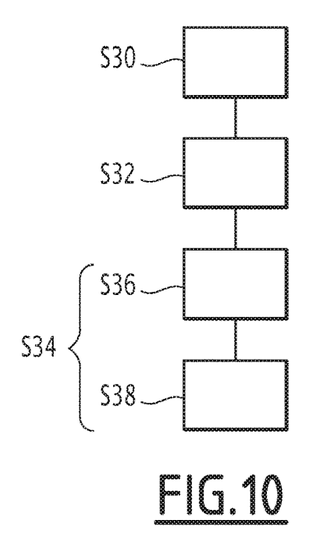

In addition to, or in place of, the control programs described above, the controller 35 may be advantageously designed to implement a third control program which will be described below, and which is shown schematically in FIG. 10.

This program includes at least the following steps:
electrically supplying the heating member 23 (step S30);
acquiring the intensity of the electric current supplying the heating member 23 and the electric voltage across the terminals of the heating member 23, under conditions in which the heating member 23 generates a negligible quantity of heat (step S32); and
determining the temperature of the exhaust gases using the electrical intensity and the electric voltage acquired (step S34).

Typically, the present program aims to determine the temperature of the exhaust gas when the heating member 23 is no longer used to heat the purification member 5, but where exhaust gas circulates through the purification device 4. This is particularly the case when the purification device 4 has reached its minimum operating temperature, and the exhaust gases are sufficient to keep the purification device hot.

For example, during step S30, the heating member 23 is electrically powered with an electric power of less than 10% of a rated electrical operating power of the device, preferably less than 5% of the nominal power, more preferably less than 1% of the nominal electric power.

In step S32, the intensity of the current and the electrical voltage at the terminals of the heating member 23 are acquired as described above, for example by using the sensors 59 and 61, or by directly calculating the current and the voltage from quantities available in the controller 35.

Step S34 comprises a substep S36 during which the electrical resistance of the, or each, heating element 25 is evaluated, typically by relating the acquired voltage to the acquired electrical intensity, taking into account the number and the arrangement of the heating element(s) 25.

Step S34 also comprises a substep S38, during which the temperature of the, or each, heating element 25 is evaluated as a function of the previously calculated electrical resistance. This temperature is evaluated as described above, from mathematical formulas, curves or tabulations available in the memory of the controller 35.

The temperature thus evaluated corresponds to the temperature of the exhaust gas, because the heating member 23 generates a zero or negligible amount of heat.

Figure 11:
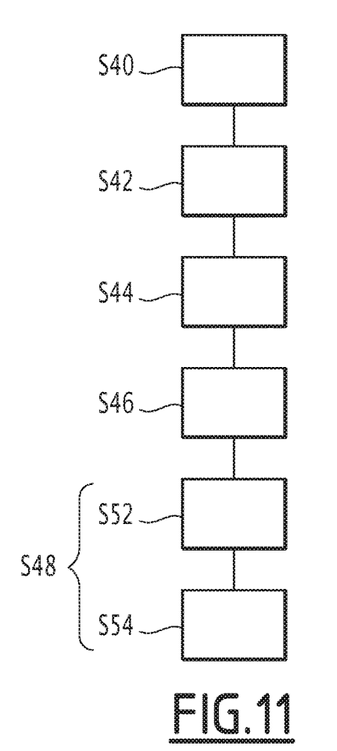

In addition to, or instead of, one of the programs described above, the controller 35 may be advantageously designed to implement a fourth control program as shown in FIG. 11.

The program includes the following steps:
electrically supplying the heating member 23 (step S40);
acquiring the intensity of the electric current supplying the heating member 23 and the electric voltage across the terminals of the heating member 23 (step S42);
determining the temperature of the, or of each, heating element 25 using the acquired electrical intensity and voltage (step S44);
determining a theoretical temperature d of the, or each, heating element that would be reached in the absence of exhaust gas circulation (step S46); and
determining the flow rate of the exhaust gas using the temperature of the, or each, heating element 25 previously determined and the theoretical temperature of the, or each, heating element 25 previously determined (step S48).

Thus, the program makes it possible to determine the flow of exhaust gas through the purification member 4, once the heating member 23 is no longer used to heat the purification member 5. This is normally the case when the purification device reaches its minimum operating temperature and the heat provided by the exhaust gas is sufficient to maintain its temperature. This program is executed when the engine is running and exhaust gas is flowing through the purification member 4.

Steps S40, S42 and S44 are similar to steps S30, S32 and S34.

The heating member 23 is supplied with electrical power that is sufficiently high to slightly raise the temperature of the, or each, heating element 25, which is therefore slightly greater than the temperature of the exhaust gas.

In step S46, the theoretical temperature determined corresponds to the theoretical temperature that the heating element, or each heating element 25 should have in the absence of exhaust gas circulation, taking into account the electric power supplied to the heating member 23.

Step S46 is performed using mathematical formulas, curves or tables stored in controller memory 35.

In step S48, the exhaust gas flow rate is determined by calculation, by carrying out an energy balance at the level of the heating element(s) 25. In fact, the difference between the theoretical temperature and the previously determined temperature is essentially explained by the heat energy transferred to the exhaust gas by the, or each, heating element 25, essentially by convection. The amount of energy transferred is a function of both the mass flow rate of the exhaust gas and the temperature of the exhaust gas. Step S48 thus comprises a sub-step S52 for acquiring the temperature of the exhaust gas and a substep S54 for determining the flow rate of the exhaust gas as a function of the temperature of the, or each, heating element 25 previously determined in step S44, and the theoretical temperature of the, or each, heating element 25 determined in step S46.

In the substep S52, the temperature of the exhaust gas is acquired directly by a temperature sensor 65 fitted to the exhaust line (FIG. 1) or is recovered in the vehicle's on-board computer 63.

The substep S54 is performed by calculation, or by using tables or curves stored in the memory of the controller 35.

The invention also relates to a method for purifying the exhaust gas, comprising the following steps:
providing a purification device 4 comprising at least one exhaust gas purification member 5 having an upstream surface 9 through which the exhaust gas enters the purification member 5 and a downstream surface 10 through which the exhaust gases exit the purification member 5; and
in the absence of forced exhaust gas circulation by a thermal engine 3 of the vehicle through the purification member 5, heating at least either the upstream zone 7 or the downstream zone 8 radiatively, for example before starting the engine 3.

The purification device 4 is typically as described above.

The heating step is performed with a heating member 23 of the type described above.

The heating step is carried out with the purification device 4 in place on board the vehicle, i.e. without disassembling the purification member 5.

As described above, the method advantageously comprises a step of forced circulation of the exhaust gas through the purification member 5, wherein the heating member 23 heats the upstream zone 8 radiatively and convectively during this circulation step.

In this case, the heating member 23 is arranged as illustrated in FIG. 2.

The forced circulation step occurs, for example, after starting the engine 3.

Alternatively, the method comprises a step of forced circulation of the exhaust gases through the purification member 5, wherein the heating member heats the downstream zone 8 radiatively, and heats another purification member at least convectively during the forced circulation stage.

In this case, the heating member 23 is arranged to face the downstream surface 10 of the purification member 5, as shown in FIG. 4. The other purification member is placed downstream of the purification member 5, but is not shown in FIG. 4.

According to yet another alternative embodiment, the heating member 23 may be placed between the purification member 5 and another purification member 41, wherein the other purification member 41 has another upstream surface 43 and another downstream surface 45 as shown in FIG. 5. In this case, the heating member 23 in the absence of forced exhaust gas circulation by the engine 3 through the purification member 5 and the other purification member 41, heats another upstream zone 50 of the other purification member 41 and the downstream zone 8 radiatively.

The other upstream zone 50 is an end section of the other purification element 41 which extends from the other upstream surface 43 in the direction of the main flow of the exhaust gases over a distance of a few millimeters to a few centimeters towards the other downstream surface 45.

In addition, in this case, the method advantageously comprises a step of forced circulation of the exhaust gases through the purification member 5 and the other purification member 41, during which the heating member 23 heats up the downstream zone 8 of the purification member 5 in a radiative manner, and the other upstream zone 50 of the purification member 41 convectively and radiatively.

Moreover, the method advantageously comprises one or more of the four control programs described above and shown in FIGS. 8 to 11.

The exhaust line 1, in particular the purification device 4 described above, is specially adapted to implement the purification method of the invention. In particular, the controller 35 is designed to implement the method described above.

Conversely, the method is intended to be implemented with a purification device and the exhaust line described above.

According to an alternative embodiment of the invention, the heating element(s) are not resistive elements, i.e. heating by emission of infrared radiation, but are induction heating elements.

According to another embodiment, the heating element(s) may be not wires but rods or wafers.

According to yet another variant, the heating member 23 is not made using elongate heating elements, but may be a perforated heating plate or any other type of adapted heating element.

The invention claimed is:

1. A method for purifying exhaust gas of a vehicle, comprising:
   providing a purification device comprising at least one exhaust gas purification member, said at least one exhaust gas purification member comprising a monolith having an upstream surface through which the exhaust gas enters the purification member and a downstream surface through which the exhaust gases exit the monolith;
   in the absence of forced exhaust gas circulation by an engine of the vehicle through the monolith, radiatively heating at least either an upstream zone or a downstream zone of the monolith, wherein the upstream zone is an end section of the monolith which extends from the upstream surface in a direction of the main flow of the exhaust gases over a first distance towards the downstream surface, and wherein the downstream zone is an end section of the monolith extending from the downstream surface in the direction of the main flow of the exhaust gases over a second distance, in the direction of the upstream surface; and
   wherein heating is carried out with a heating member positioned in front of and upstream from the upstream surface or in front of and downstream of the downstream surface, the heating member being separated from the upstream surface or the downstream surface by a non-zero third distance, and wherein the heating member comprises at least one electrically-powered heating wire folded so that the least one electrically-powered heating wire extends in one or more planes substantially parallel to the upstream surface or the downstream surface.

2. The method according to claim 1, wherein the, or each, electrically-powered heating wire is of a material selected from FeCrAl and its alloys, NiCr and its alloys, stainless steel or inconel.

3. The method according to claim 1, including:
   acquiring an intensity of an electric current supplying the heating member and a voltage at terminals of the heating member; and
   determining a temperature of the, or each, electrically-powered heating wire using the electrical intensity and voltage acquired.

4. The method according to of claim 1, including:
   electrically supplying the heating member;
   acquiring an intensity of an electric current supplying the heating member and a voltage at terminals of the heating member, when the heating member is at a known predetermined temperature;
   evaluating an electrical resistance of the, or each, electrically-powered heating wire using the electrical intensity and voltage acquired; and
   detecting any damage to the, or at least one of the, electrically-powered heating wires using the electrical resistance as evaluated.

5. The method according to claim 1, including:
   electrically supplying the heating member;
   acquiring an intensity of an electric current supplying the heating member and an electric voltage across the electrically-powered heating wire under conditions in which the heating member generates a negligible quantity of heat;

determining a temperature of the exhaust gas using the electrical intensity and voltage acquired.

6. The method according to claim 1, including:
electrically supplying the heating member;
acquiring an intensity of an electric current supplying the heating member and a voltage at terminals of the heating member;
determining a temperature of the, or each, electrically-powered heating wire using the electrical intensity and voltage acquired;
determining a theoretical temperature of the, or each, electrically-powered heating wire that would be reached in the absence of exhaust gas circulation; and
determining an exhaust gas flow rate using the temperature of the, or each, electrically-powered heating wire previously determined and the theoretical temperature of the, or each, electrically-powered heating wire previously determined.

7. The method according to claim 1, wherein a reflector is placed on an opposite side to the upstream surface or downstream surface relative to the heating member, and reflects towards the upstream surface or downstream surface, a thermal radiation emitted by the heating member in a direction opposite to the upstream surface or downstream surface.

8. The method according to claim 1, wherein the method comprises a step of the forced circulation of the exhaust gas through the purification member, wherein the heating member heats the upstream zone radiatively and convectively during the circulation stage.

9. The method according to claim 1, wherein the method further comprises a step of the forced circulation of the exhaust gas through the purification member, wherein the heating member heats the downstream zone radiatively and heats another purification member at least convectively during the forced circulation step.

10. The method according to claim 1, wherein the purification member comprises a first purification member, and wherein the heating member is placed between the first purification member and a second purification member, wherein the the second purification member has a second upstream surface through which the exhaust gases enter the second purification and a second downstream surface through which the exhaust gases exit the second purification member, wherein the heating member, in the absence of forced circulation of the exhaust gas by the engine through the purification member and the second purification member, radiatively heats an upstream zone of the second purification and the downstream zone of the first purification member, wherein the upstream zone of the second purification member is an end section of the other second purification that extends from the other second upstream surface in the direction of the main flow of the exhaust gases over a distance fourth in the direction of the second downstream surface.

11. The method according to claim 1, including holding the at least one electrically-powered heating wire fixed relative to the purification member such that the at least one electrically-powered heating wire is not moveable relative to the purification member.

12. The method according to claim 1, including beginning radiatively heating the upstream zone or downstream zone of the purification member before the engine is started.

13. The method according to claim 1, including only activating the at least one electrically-powered heating wire to begin radiatively heating the upstream zone or downstream zone of the purification member when the at least one electrically-powered heating wire is facing the upstream surface or downstream surface of the purification member.

14. The method according to claim 1, including beginning radiatively heating the upstream zone or downstream zone of the purification member when at least one vehicle door is unlocked, or when a key is inserted into a corresponding key slot, or when the key is turned to a first position controlling a circuit power supply without starting the engine.

15. The method according to claim 1, wherein the purification member is defined by a length extending from the upstream surface to the downstream surface, and wherein the first and second distances are less than the length such that the upstream and downstream zones respectively comprise upstream and downstream end sections of the purification member that are separated from each other by a center section of the purification member, and wherein the non-zero third distance between the heating member and the upstream surface or the downstream surface of the monolith comprises an open gap.

16. The method according to the claim 1, wherein the at least one electrically-powered heating wire is heated to a temperature between 500 and 1000° C., in order to emit mainly in an infrared range.

17. The method according to the claim 16, wherein the heating member comprises a frame, the at least one electrically-powered heating wire being fixed to the frame.

18. The method according to the claim 17, wherein the frame defines an inner empty area, the at least one electrically-powered heating wire extending in the inner empty area.

19. The method according to the claim 17, wherein the at least one electrically-powered heating wire is fixed to the frame at a plurality of points distributed over an entire length of the at least one electrically-powered heating wire.

20. The method according to the claim 17, wherein the frame is made of an electrically-conductive material, the at least one electrically-powered heating wire being fixed to the frame via electrically-insulating fasteners.

21. The method according to the claim 1, wherein the at least one electrically-powered heating wire is free of electrically insulating coating.

22. The method according to the claim 1, wherein the heating member radiatively transmits a thermal power of between 500 W and 10 kW to the at least one exhaust gas purification member.

* * * * *

UNITED STATES PATENT AND TRADEMARK OFFICE
CERTIFICATE OF CORRECTION

PATENT NO. : 10,989,086 B2
APPLICATION NO. : 15/944916
DATED : April 27, 2021
INVENTOR(S) : Xavier Bartolo Page 1 of 1

It is certified that error appears in the above-identified patent and that said Letters Patent is hereby corrected as shown below:

In the Claims

In Claim 8, Column 15, Line 27; replace "the forced circulation" with --forced circulation--

In Claim 8, Column 15, Line 30; replace "the circulation stage" with --a circulation stage--

In Claim 9, Column 15, Line 32; replace "the forced circulation" with --forced circulation--

In Claim 9, Column 15, Line 36; replace "the forced circulation step" with --the step of forced circulation--

In Claim 10, Column 15, Line 48-49; replace "the second purification and" with --the second purification member and--

In Claim 10, Column 15, Line 51; replace "the other second purification that extends" with --the second purification member that extends--

In Claim 10, Column 15, Line 52; replace "the other second upstream surface" with --the second upstream surface--

In Claim 10, Column 15, Line 54; replace "a distance fourth in the direction" with --a fourth distance in the direction--

Signed and Sealed this
Twenty-ninth Day of March, 2022

Drew Hirshfeld
*Performing the Functions and Duties of the
Under Secretary of Commerce for Intellectual Property and
Director of the United States Patent and Trademark Office*